Dec. 27, 1938.   P. SCHÜTTLER   2,141,365
FUEL REGULATOR FOR CARBURETORS
Filed May 2, 1938
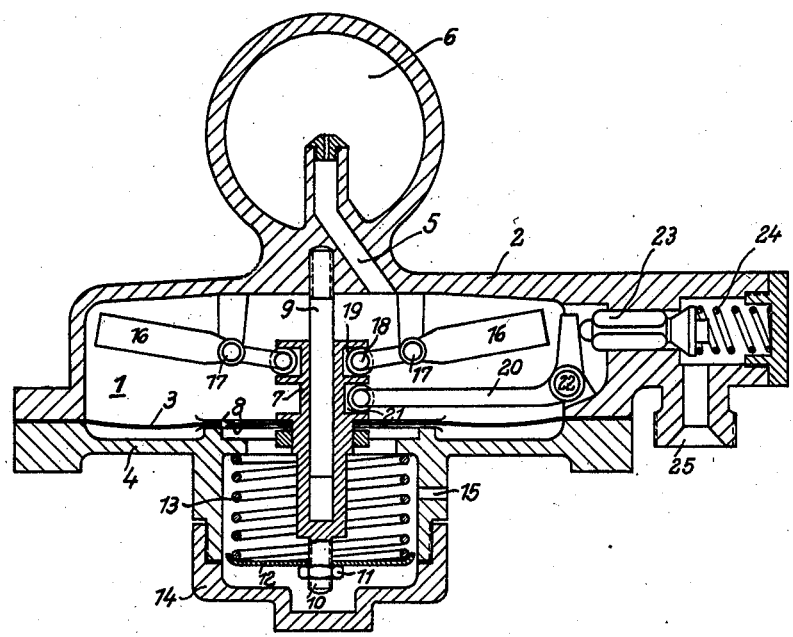

Patented Dec. 27, 1938

2,141,365

UNITED STATES PATENT OFFICE 2,141,365

FUEL REGULATOR FOR CARBURETORS

Paul Schüttler, Berlin-Charlottenburg, Germany, assignor to Pallas Apparate G. m. b. H., Berlin, Germany, a corporation of Germany Application May 2, 1938, Serial No. 205,656
In Germany May 15, 1937

7 Claims. (Cl. 137—153)

The invention relates to regulators for the control of fuel feed to carburetors especially for use in air and land vehicles which require lack of sensitivity to change in position of the vehicle. Float regulators do not fulfill this requirement and for that reason diaphragm regulators have been proposed. In such regulators inelastic diaphragms are used and it is attempted to obtain a balancing of the fuel pressure in all positions by means of a counterweight.

None of the diaphragm regulators heretofore proposed, however, have successfully provided a uniform control of fuel feed in all positions of the vehicle, and particularly the known regulators have not been suitable for use with the recently highly developed aviation motors. It is not only desirable that the regulator should not be sensitive to the position of the vehicle so that uniform fuel feed is maintained in any position, but it is also highly desirable that the flow of fuel be definitely shut off when the motor is stopped in any position of the vehicle in order to decrease the danger of fire in the case of accidents.

Moreover, the force required to equalize the static fuel pressure on a diaphragm is not constant. It varies with the specific gravity of the fuel and is also dependent on the pressure of the fuel supply pump, since the shut-off valve is operated by the diaphragm and transmits to the diaphragm the pump pressure exerted on the valve. The use of a constant equalizing force does not permit the adjustment of the regulator to these varying influences and it is therefore desirable to provide for a suitable adjustment of the equalizing force.

In addition to the necessity for complete lack of sensitivity to position, it is also desirable, in order to maintain a constant relation between the amount of fuel used and the supply of fuel, that the formation of air pockets or air bubbles in any portion of the space between the regulator and the nozzle opening be avoided by the provision of the shortest possible conduits and the avoidance of recesses in which air might collect.

Finally, it has been found that the automatic altitude regulation of aviation carburetors may be improved and assisted, and in the case of land vehicles a satisfactory automatic altitude regulation may be provided, if the regulator can be adjusted so that the level of the fuel in the nozzle supply tube is a short distance below the opening of the nozzle into the mixing chamber of the carburetor when the engine is stopped.

The requirements just outlined are fully met by the fuel regulator of the invention.

The regulator of the invention includes a horizontal inelastic diaphragm forming the bottom of a fuel supply chamber, the walls of which rise upwardly from the diaphragm, and a conduit rising from the fuel supply chamber to the mixing chamber. In the fuel supply chamber above the diaphragm is provided a pivoted counterweight acting on the diaphragm, while below the diaphragm in a space communicating with the atmosphere is a spring acting on the diaphragm in opposition to the counterweight and under such a tension that in the horizontal position of the carburetor the resultant of the weight and the spring substantially equalizes the weight of the fuel column on the diaphragm while in the vertical position of the carburetor this is effected by the tension of the spring alone.

By providing a suitably shaped, for example, disc-shaped counterweight in the fuel chamber, the weight may be utilized to damp liquid oscillations. The spring is so arranged that it can be readily replaced and can be adjusted to any desired degree from the outside during operation.

An illustrative embodiment of the invention is diagrammatically shown in the accompanying drawing.

The bottom of the fuel chamber 1 in the regulator housing 2 is formed by the horizontal, inelastic diaphragm 3 which is tightly held to the housing by means of bolted on cover plate 4. The fuel chamber 1 is bounded only by smoothly shaped, upwardly directed walls and at the highest point of the fuel chamber the fuel passes through conduit 5 to the spray nozzle which lies approximately in the axis of the horizontally extending mixing chamber 6. Air cushions or air bubbles cannot form in the fuel chamber or in the nozzle conduit.

A guide bushing 7, which passes through the diaphragm, holds the latter tightly gripped between two plates 8. The bushing slides upon guiding stud 9 which is tightly screwed into housing 2. The closed lower end of bushing 7 ends in a threaded extension 10 carrying nut 11, which supports the spring plate 12. Between plate 12 and an annular engaging ring of cover 4, spring 13 is mounted under compression and tends to urge the membrane downwardly. In the resting position shown in the drawing the lower gripping plate 8 of the diaphragm rests on an annular projecting ring of cover 4. A protecting cap 14 in threaded engagement with an annular projection from cover 4 forms therewith a spring chamber which is in communication with the atmosphere through hole 15.

In fuel chamber 1 above the diaphragm, two counterweights 16 oppose the tension of the spring. They are pivoted at 17 from supports projecting from the housing to form a double arm lever and act on bushing 7 through rollers 18, at the ends of the inner lever arms, engaging annular groove 19 on the bushing. The weights 16 are selected so that in horizontal resting position of the regulator they balance the pressure of the fuel on the diaphragm and the tension of spring 13, as well as the unilateral pressure exerted by the weight guiding bushing, plates and lever arm 20 on the diaphragm. The weights 16 can be made in the form of annular plates in order to damp oscillations by means of the large surfaces thus provided. A roller at the end of lever member 20 engages annular groove 21 in bushing 7. The lever is pivoted at 22 and the end of opposite arm engages the spring-pressed fuel valve needle 23. In the resting position shown in the drawing, there is a slight play between the lever arm and the valve needle in order that the needle will sit tightly on the conical seal under the pressure of the pump and the spring. Fuel is supplied to valve chamber 24 through conduit 25. It can be seen clearly from the drawing that on removing cap 14 the tension of the spring 13 can be varied by varying the position of nut 11, and in this way the level of the fuel in the nozzle supply tube can be changed. The adjustment of this level a certain distance below the nozzle opening assists altitude compensation by decreasing the nozzle feed with increasing altitude and in the case of land vehicles the compensation this way can suffice to correct for the undesired fuel excess at higher altitudes.

The spring 13 is so dimensioned and tensioned that when the carburetor is laying on its side the tension of the spring alone balances the pressure of the fuel on the diaphragm. In overturned position, the weights 16 and spring 13 act in the same direction and insure in every position the closing of the fuel supply valve when the machine is stopped.

I claim:

1. Fuel regulator for internal combustion engine carburetors comprising an inelastic diaphragm forming, in normal position of the regulator, the bottom of a fuel chamber, a counterweight pivotally mounted in said fuel chamber in engagement with said diaphragm, a spring positioned outside said chamber in engagement with said diaphragm and urging said diaphragm oppositely to the direction of action of the counterweight in normal position of the regulator, conduit means for supplying fuel from said chamber to the mixing chamber of a carburetor, and means actuated by the movement of said diaphragm for controlling the flow of fuel to said chamber.

2. Fuel regulator for internal combustion engine carburetors comprising an inelastic diaphragm, a housing member forming with said diaphragm a fuel chamber, said diaphragm forming the floor of said chamber and the walls of said housing member passing directly upward from said diaphragm in the normal position of said regulator, a counterweight pivotally mounted in said fuel chamber in engagement with said diaphragm, a spring positioned outside said chamber in engagement with said diaphragm and urging said diaphragm oppositely to the direction of action of the counterweight in normal position of the regulator, conduit means for supplying fuel from said chamber to the mixing chamber of a carburetor, and means actuated by the movement of said diaphragm for controlling the flow of fuel to said chamber.

3. Fuel regulator for internal combustion engine carburetors comprising an inelastic diaphragm, a housing member forming with said diaphragm a fuel chamber, said diaphragm forming the floor of said chamber and the walls of said housing member passing directly upward from said diaphragm in the normal position of said regulator, a counterweight pivotally mounted in said fuel chamber in engagement with said diaphragm, a spring positioned outside said chamber in engagement with said diaphragm and urging said diaphragm oppositely to the direction of action of the counterweight in normal position of the regulator, conduit means rising upward from the highest point of said chamber for supplying fuel from said chamber to the mixing chamber of a carburetor, and means actuated by the movement of said diaphragm for controlling the flow of fuel to said chamber.

4. Fuel regulator for internal combustion engine carburetors comprising an inelastic diaphragm, a housing member forming with said diaphragm a fuel chamber, said diaphragm forming the floor of said chamber and the walls of said housing member passing directly upward from said diaphragm in the normal position of said regulator, a counterweight pivotally mounted in said fuel chamber in engagement with said diaphragm, a spring positioned outside said chamber in engagement with said diaphragm and urging said diaphragm oppositely to the direction of action of the counterweight in normal position of the regulator, the resultant of the forces exerted on said diaphragm by said counterweight and said spring being equivalent to the pressure of the fuel on said diaphragm, conduit means for supplying fuel from said chamber to the mixing chamber of a carburetor, and means actuated by the movement of said diaphragm for controlling the flow of fuel to said chamber.

5. Fuel regulator for internal combustion engine carburetors comprising an inelastic diaphragm, a housing member forming with said diaphragm a fuel chamber, said diaphragm forming the floor of said chamber and the walls of said housing member passing directly upward from said diaphragm in the normal position of said regulator, an annular disc counterweight pivotally mounted in said fuel chamber in engagement with said diaphragm, a spring positioned outside said chamber in engagement with said diaphragm and urging said diaphragm oppositely to the direction of action of the counterweight in normal position of the regulator, conduit means for supplying fuel from said chamber to the mixing chamber of a carburetor, and means actuated by the movement of said diaphragm for controlling the flow of fuel to said chamber.

6. Fuel regulator for internal combustion engine carburetors comprising an inelastic diaphragm, a housing member forming with said diaphragm a fuel chamber, said diaphragm forming the floor of said chamber and the walls of said housing member passing directly upward from said diaphragm in the normal position of said regulator, a counterweight pivotally mounted in said fuel chamber in engagement with said diaphragm and shaped to damp liquid oscillations in said chamber, a spring positioned outside said chamber in engagement with said diaphragm and urging said diaphragm oppositely to the direction of action of the counterweight in normal position of the regulator, conduit means for supplying fuel from said chamber to the mixing chamber of a carburetor, and means actuated by the movement of said diaphragm for controlling the flow of fuel to said chamber.

7. Fuel regulator for internal combustion engine carburetors comprising an inelastic diaphragm, a housing member forming with said diaphragm a fuel chamber, said diaphragm forming the floor of said chamber and the walls of said housing member passing directly upward from said diaphragm in the normal position of said regulator, a counterweight pivotally mounted in said fuel chamber in engagement with said diaphragm, a spring positioned outside said chamber in engagement with said diaphragm and urging said diaphragm oppositely to the direction of action of the counterweight in normal position of the regulator, means for adjusting the tension of said spring from outside said fuel chamber, conduit means for supplying fuel from said chamber to the mixing chamber of a carburetor, and means actuated by the movement of said diaphragm for controlling the flow of fuel to said chamber.

PAUL SCHÜTTLER.